UNITED STATES PATENT OFFICE.

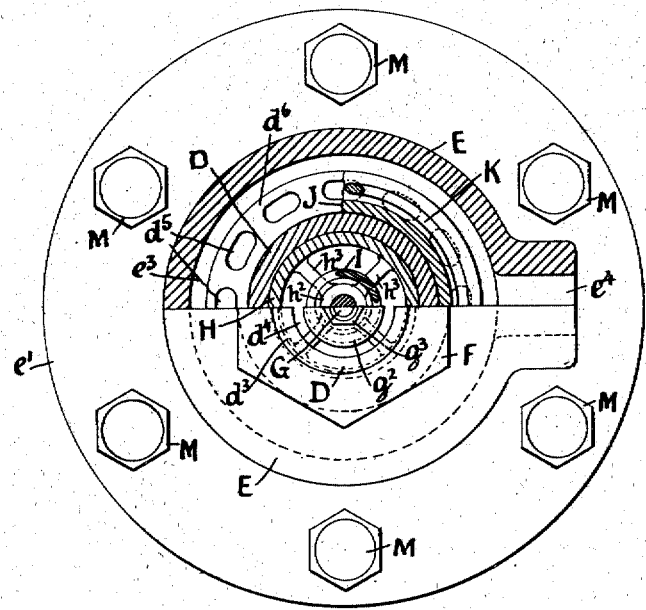

JOHN ASTROM, OF FORT WAYNE, INDIANA.

VALVE MECHANISM FOR AIR-COMPRESSORS.

986,122.  Specification of Letters Patent.  Patented Mar. 7, 1911.

Application filed April 29, 1910. Serial No. 558,408.

*To all whom it may concern:*

Be it known that I, JOHN ASTROM, of Fort Wayne, Indiana, have invented Valve Mechanism for Air-Compressors, of which the following is a specification.

My invention relates to air-compressors of the reciprocating type, in which a piston reciprocates within a cylinder which is connected with intake- and outlet-valves at the end thereof; and my invention has for its object, first, to provide a simple and efficient arrangement of valve-mechanism whereby the clearance-space due to the valves is materially reduced; and secondly, to provide a construction in which the unequal expansion of parts due to heat of compression is to a great extent neutralized and thereby air-leaks avoided which are the cause of frequent troubles and loss of efficiency.

In my invention I provide a concentric arrangement of the valve-mechanism, which is situated in the head of and concentric with the cylinder; the intake-valve being central and having its face normally flush with the inner face of the cylinder-head, while the outlet- or exhaust-valve surrounds the intake-valve annularly and is located in an annular chamber which is separated by a cylindrical partition-wall from the intake-chamber.

The nature of my invention will best be understood by a consideration of the accompanying drawings, which show the most improved embodiment of my invention, taken in connection with the following detail description thereof.

In these drawings Figure 1 is a plan-view of the cylinder-head and valve-mechanism, partly in section on the plane 1, and Fig. 2 is a longitudinal section of the same and of the upper portion of the cylinder.

In these drawings every reference character refers to the same part in each figure.

At A is shown one end of an ordinary compressor-cylinder, in which is reciprocated the piston B by means of the piston-rod C. The cylinder-head consists of two concentric parts, viz., an inner head D and an outer head E, which are firmly and hermetically secured to each other and to the cylinder A by means of bolts M passing through the flanges $a'$, $d'$, and $e'$ of said three elements. The inner head D is provided with a central cylindrical portion on the outer side of which, at some distance from the flange $d'$, is formed a shoulder $d^2$, and the outer head E is provided with a faced internal flange $e^2$ which is made to fit neatly upon the shoulder $d^2$ at the same time that the flanges $a'$, $d'$, and $e'$ are bolted together, thus making an air-tight joint at this point. The abutting surfaces may be ground to fit so that the two joints are made accurately, and to assist in the tightness of the upper joint there is provided a nut F which is screwed down upon the threaded end $d^3$ of the inner head D. This construction provides, as will be seen, an inner central chamber $d^4$, which is the intake-passage, and an outer annular chamber $e^3$, which is a part of the exhaust-passage and is connected by any passageway $e^4$ with a pipe or other conduit leading to a compression-tank.

In the intake-passage $d^4$ is located the intake- or suction-valve G, which, as will be seen, has a circular bevel-edged head $g'$ fitting neatly upon a beveled seat $h'$ on the inner end of a lining sleeve H, which fits with a driving fit in the inner faced end of the passage $d^4$, and, as will be seen, the inner face of the head $g'$ lies flush with the inner face of the inner head D. Said valve G is separated and guided in a sleeve $h^2$ which forms a part of liner H and is connected therewith by radial arms $h^3$; and said valve is held normally closed by a coiled compression-spring I, which abuts upon the arms $h^3$ and a washer $g^2$ mounted on the outer end of the stem of the valve G and secured in place by a nut $g^3$.

The outer chamber $e^3$ is connected with the cylinder by means of a circularly disposed series of ports $d^5$ or passages formed in the inner head D, and the outer surface of the head D is faced off annularly about these ports to form a valve-seat $d^6$. Upon this valve-seat normally rests the annular flange of the valve-sleeve J, which slides upon the faced outer surface of the head D within the chamber $e^3$, and is held in its normal closed position by a coiled compression-spring K abutting upon the flange $e^2$ and that of the valve. This valve opens outwardly into the exhaust-chamber $e^3$.

It will be evident that, when the piston B retires, the excess of pressure outside the cylinder causes the valve G to open inwardly, admitting air to the cylinder, while the valve J is held closed by the excess of pressure in the chamber $e^3$; and when the piston advances, raising the pressure in the cylinder, such excess of pressure in conjunction with the spring I causes the valve G to close and remain closed, while as the pressure rises above equality with that in the exhaust-chamber $e^3$ the valve J is raised against the pressure of the spring K and the air escapes into said exhaust-chamber, from which it is conveyed to the compression-tank.

It will be seen that the arrangement of parts is such that there is no clearance-space due to the intake-valve, and the only clearance-space due to the exhaust-valve is that of the short ports $d^5$. The total cylinder-clearance can therefore, in this design of cylinder-head, be made unusually small and the efficiency of the compressor correspondingly high. Further, it will be observed that the cylindrical walls of both the inner and outer heads are on one side exposed to the temperature of the outside air and on the other side to the temperature of the air heated by compression. The mean temperature of these walls will therefore be approximately the same, whereby all the difficulties due to unequal expansion and possible stresses causing breakage, deformation, and leaks in the joints and valves are practically eliminated.

I do not wish it understood that my invention is limited to the use of all the above described features and constructions, for some may be omitted and others may be varied or modified in various ways, as will readily occur to those skilled in the art.

Having thus described my invention, what I claim as new and desire to secure by Letters Patent is:

1. The combination with a compressor-cylinder of inner and outer cylindrical heads, the inner head having a central passageway and the outer head being separated therefrom by an annular chamber and there being passages connecting said chamber with the cylinder, a valve opening in one direction in said passageway, and a valve covering said passages and opening in the other direction.

2. The combination with a compressor-cylinder of inner and outer cylindrical heads, said inner head containing a central passageway, an inwardly opening intake-valve located in said passageway and normally closing the same, there being an annular chamber between the inner and outer head and passages connecting said chamber with the cylinder, and an annular outlet-valve opening outwardly and normally closing said passages.

3. The combination with a compressor-cylinder of inner and outer cylindrical heads, the inner head having a central passageway and the outer head being separated therefrom by an annular chamber and there being passages connecting said chamber with the cylinder and a single normally closed valve covering all of said passages.

4. The combination with a compressor-cylinder of inner and outer cylindrical heads, the inner head having a central passageway and being united with the outer head by hermetic joints at each end and being spaced apart therefrom in the center, leaving an annular chamber, passages connecting said chamber with the cylinder, means normally closing said passages and opening by gas-pressure in one direction, and means normally closing said central passageway and opening by gas-pressure in the opposite direction.

5. The combination with a compressor-cylinder of inner and outer cylindrical heads, the inner head having a central passageway and being united with the outer head by hermetic joints at each end and being spaced apart therefrom in the center, leaving an annular chamber, passages connecting said chamber with the cylinder, a single annular valve in said chamber, and means for yieldingly holding said valve in a position to close said passages.

6. In combination with a compressor-cylinder, an inner head and an outer head mounted concentrically upon the end of the cylinder, said inner head and outer head each having a cylindrical portion and co-acting surfaces at a distance from the cylinder which form a hermetic joint leaving an annular chamber between them, said inner head having a central tubular passageway, and valve mechanism mounted in said passageway and chamber.

7. The combination with a compressor-cylinder of an inner head having an annular flange and a cylindrical portion provided with a faced shoulder; an outer head having a marginal annular flange fitting upon said first-named flange, a cylindrical portion parallel to and at a distance from the cylindrical portion of said inner head leaving between them an annular chamber, and an internal annular flange coacting with said shoulder and forming a hermetic joint therewith when the two marginal flanges are hermetically superposed; there being passages connecting said chamber with said cylinder; and valve-mechanism adapted to close said passages.

8. The combination with a compressor-cylinder of an inner head having an annular flange and a cylindrical portion inclosing a central passageway and provided exteriorly with a faced shoulder; an outer head having a marginal annular flange fitting upon said first-named flange, a cylindrical portion parallel to and at a distance from the cylindrical portion of said inner head leaving between them an annular chamber, and an internal annular flange coacting with said shoulder and forming a hermetic joint therewith when the two marginal flanges are hermetically superposed; there being passages connecting said chamber with said cylinder; an inwardly opening intake-valve normally closing said central passageway and having a disk-face which lies flush with the inner face of said inner head; and means for normally closing said passages.

9. The combination with a compressor-cylinder of an inner head having an annular flange and a cylindrical portion provided with an external faced shoulder; an outer head having a marginal annular flange fitting upon said first-named flange, a cylindrical portion parallel to and at a distance from the cylindrical portion of said inner head, and an internal annular flange coacting with said shoulder and forming a hermetic joint therewith when the two marginal flanges are hermetically superposed; there being a chamber inclosed between said inner and outer heads and passages connecting said chamber with said cylinder; an annular outlet valve surrounding the cylindrical portion of said inner head and normally closing said passages, and means for normally holding said annular valve in closed position.

In witness whereof I have hereunto set my hand this 25th day of April, 1910.

JOHN ASTROM.

Witnesses:
M. SMITH-PETERSEN,
OSCAR L. RHOADS.